United States Patent [19]

Tadashi et al.

[11] 4,009,308
[45] Feb. 22, 1977

[54] PROCESS FOR PRODUCING REFRACTORIES

[75] Inventors: Zenbutsu Tadashi; Asami Hajime, both of Bizen; Uemura Seiichi, Kawasaki; Hirose Takao, Kamakura, all of Japan

[73] Assignees: Shinagawa Refractories Co., Ltd.; Nippon Oil Company Ltd., both of Tokyo, Japan

[22] Filed: June 18, 1975

[21] Appl. No.: 587,970

[30] Foreign Application Priority Data

June 25, 1974 Japan .............................. 49-71877

[52] U.S. Cl. ................................ 427/443; 428/304; 428/489; 427/294; 208/22; 208/40; 106/273 R
[51] Int. Cl.$^2$ ......................................... C04B 41/04
[58] Field of Search ............ 208/22; 428/304, 489; 427/294, 443; 106/273

[56] References Cited

UNITED STATES PATENTS

| | | | |
|---|---|---|---|
| 3,318,801 | 5/1967 | Alexander et al. | 208/22 X |
| 3,355,377 | 11/1967 | King | 208/22 |
| 3,540,901 | 11/1970 | Kaltner | 106/60 |

*Primary Examiner*—Ralph S. Kendall
*Attorney, Agent, or Firm*—Birch, Stewart, Kolasch and Birch

[57] ABSTRACT

A process for producing refractories wherein an impregnant is filled into open pores of the refractories. The impregnant is the thermoplastic resinous material which is obtained by removing a light fraction having a boiling point of less than 200° C under a reduced pressure of 100 mmHg and having a benzene-insoluble fraction content of less than 10% by weight from at least one member selected from the group consisting of a heavy oil obtained by the steam cracking of petroleum and the polymerization product of said heavy oil. The slag penetration resistance, slag erosion resistance and slaking resistance of the impregnated refractories are improved thereby.

14 Claims, No Drawings

PROCESS FOR PRODUCING REFRACTORIES

The present invention relates to a process for producing refractories.

It has been hitherto known that carbonaceous substances show strong resistance against wetting and penetration of molten steel and slag and therefore various impregnants with high a fixed carbon content have been developed. Impregnants for refractories must, in particular, satisfy various conditions that not only the fixed carbon content is high, but also no atmospheric contamination occurs during their use, the price is cheap and the boiling range thereof is broad.

Hitherto, there has been adopted a process for filling a coal tar pitch into open pores of refractories by impregnating the coal tar pitch into the refractories in the final step after the burning of the fire brick in order to prevent a slag erosion of the refractories of the dolomite type, magnesia type, alumina type and carbon type by molten steel and slag. However, the coal tar pitch contains a large amount of nitrogen- and oxygen-containing compounds which are harmful to human beings and for this reason many serious sanitary problems for workers at the time of producing or using the refractories. Also it is necessary to dilute the coal tar pitch with anthracene oil or creosote oil because it is required that the viscosity of the impregnating liquid must be at least less than 200 centipoise in order to facilitate the workability using the coal tar pitch in the production of refractories, particularly when the uniform impregnation of the coal tar pitch into an inner part of the refractories is desired in the use of coal tar pitch as the impregnant. As a result, there is the disadvantage that such toxic solvents must necessarily be employed and therefore it is the present objective to obtain a substitute for the coal tar pitch which does not have the above-mentioned troubles.

Under these circumstances, there has been proposed to use resins which have a comparatively high fixed carbon content, such as liquid phenol resins, liquid furan resins and the like. However, these resins contain a large amount of unreacted components, for example the phenol resin contains phenol, formaldehyde and others and also the furan resin contains furfuryl alcohol, furfural and others, and therefore in these resins an offensive odor is extreme, an atmospheric contamination is violent, a care for handling of it must be taken, the property of these resins is poor, and particularly the dolomite refractories absorb moisture which is present in the air during storage and as a result slaking spots and cracks are generated to disintegrate the refractories. Due to these facts, it is not preferable to use these resins.

The object of the present invention is to provide a process for producing refractories wherein a slag resistance and slaking resistance of the refractories are improved by using a new type of impregnant.

As a result of various investigations of thermoplastic resinous materials which are effective as the impregnant of refractories, according to the present invention, it has been now found that by using a thermoplastic resinous material which is obtained by removing a light fraction having a boiling point of less than 200° C under the reduced pressure of 100 mmHg and having benzene-insoluble fraction content of less than 10% by weight from a heavy oil obtained by the steam cracking of petroleum, from the polymerization product of said heavy oil in the presence or absence of a catalyst or from a mixture of said heavy oil and said polymerization product, the above-mentioned disadvantages are eliminated and thus refractories having the durability the same as or greater than that of products which are obtained by using the prior impregnants of coal tar pitch and resins are provided.

Therefore, the present invention is directed to a process for producing refractories in which an impregnant is filled into open pores of the refractories, characterized in that the impregnant is a thermoplastic resinous material which is obtained by removing a light fraction having a boiling point of less than 200° C under the reduced pressure of 100 mmHg and having a benzene-insoluble fraction content of less than 10% by weight from at least one member selected from the group consisting of a heavy oil obtained by the steam cracking of petroleum and a polymerization product of said heavy oil.

The thermoplastic resinous material according to the present invention has characteristic properties that the fixed carbon content is high and the benzene-insoluble fraction content is very low.

It has been considered that in the prior art regarding impregnants the amount of $\beta$-resin in which the quinoline-insoluble fraction is removed from the benzene-insoluble fraction must be increased, and that the carbonization percentage of the binder and the physical properties of the carbon product become excellent with the increase of the amount of $\beta$-resin.

On the contrary, however, the thermoplastic resinous material according to the present invention contains a very low benzene-insoluble fraction and substantially none of the quinoline-insoluble fraction, and despite these facts the fixed carbon content is very high, therefore and the thermoplastic resinous material according to the present invention shows good characteristics equal to or superior to the coal tar pitch.

In addition, in the case of impregnating the impregnant into the burned refractories, it is frequently required that the melt viscosity of the impregnant be finely adjusted depending upon the condition of the pores of the refractories and the impregnation condition. In the thermoplastic resinous material according to the present invention, however the solvent which is used as the viscosity regulating agent can be selected in a broad range due to the fact that the benzene-insoluble fraction content is very low.

Therefore, various kinds of petroleum solvents which have high safety, for example 70 pale oil, lube oil fractions such as SAE 10, 20 and 30, bright stock, and heavy fuel oil can be preferably applied to the present invention, in spite of the fact that they are not able to be used in the case of coal tar pitch, so that the above-mentioned disadvantages can be eliminated.

The solubilities of the thermoplastic resinous material according to the present invention and coal tar pitch into B heavy fuel oil which is one of the petroleum solvents have been investigated. These results are shown in Table 1.

Table 1

| Sample | I<br>Thermoplastic resinous material obtained as residue by steam cracking of gas oil. Fraction with boiling point of more than 250° C/100 mmHg | II<br>Thermoplastic resinous material obtained by heat-treating at 400° C the residue obtained by stream cracking of gas oil | III<br>Hard tar pitch |
|---|---|---|---|
| Softening point (° C) | 100 | 110 | 82 |
| Conradson carbon (% by wt.) | 40 | 49 | 53 |
| Benzene-insoluble fraction (% by wt.) | 3 | 16 | 35 |
| Quanoline-insoluble fraction (% by wt.) | 0 | 0.2 | 7 |
| State of* mixture | Completely and uniformly dissolved | Insoluble particles are separated to give a suspension and are precipitated on standing | Separation of two layers occurs and two components are scarcely dissolved in each other |

*Sample is mixed with B heavy fuel oil in the ratio of 1:1 (by wt.) and the resultant mixture is heated at 150° C.

From these results it is clear that the thermoplastic resinous materials which are used according to the present invention have a superior function and effect to the prior tar pitch product in the view point of comparatibility with the solvent. Therefore, a complete impregnation can be realized.

The thermoplastic resinous material which may be used according to the present invention is one which contains less than 10% by weight of benzene-insoluble fraction and which is obtained by removing a light fraction having a boiling point of less than 200° C under the reduced pressure of 100 mmHg and having a benzene-insoluble fraction content of less than 10% by weight from a heavy oil obtained by the steam cracking of petroleum, for example naphtha, kerosene, gas oil, or a mixture of these petroleum hydrocarbons at about 700° to 1,000° C, or from the polymerization product of said heavy oil in the presence or absence of a catalyst, or from the mixture of the heavy oil and the polymerization product.

Without removing light fractions of boiling point of less than 200° C under the reduced pressure of 100 mmHg, when the thermoplastic resinous material is impregnated into open pores of refractories, there are the dangers such as fire and explosion of vapor of the light fractions in the impregnating vessel which is heated to about 200° C, and furthermore when the refractories which are impregnated with the thermoplastic resinous material are utilized in converters at high temperature, the light fraction evaporates in a short time, and damage and the decrease of the slag resistance of the refractories occur.

The polymerization of said heavy oil can be carried out in the absence of a catalyst, but it is preferable to use a catalyst when said heavy oil is polymerized. As examples of the catalyst, there are mentioned salts of iron, tin, aluminum or zinc, for example, the chloride and nitrate, and a radical polymerization catalyst, for example benzoylperoxide and azobisisobutyronitrile. An oxidative polymerization using oxygen or oxygen-containing gases or oxygen-liberating compounds can also be adopted. The reaction temperature is suitably selected from the range of from room temperature to 350° C depending upon the kind of the catalyst and particularly in the case of the oxidative polymerization a temperature of 200° to 300° C is preferably selected. On the other hand, the reaction pressure is preferably either at normal pressure or a pressure higher than normal pressure. The reaction time may be freely selected according to the desired properties of the polymerization product.

The thermoplastic resinous material which is used in the present invention must satisfy the before-mentioned physical properties as an impregnant. For that reason, it is preferable to use the thermoplastic resinous material wherein the softening point is 50° to 100° C, the melt viscosity at 250° C is less than 200 centipoise, the fixed carbon content (Conradson carbon) is 30 to 60% by weight and also the benzene-insoluble fraction content is less than 10% by weight, preferably less than 5% by weight.

If the softening point is too low, the fixed carbon content begins to decrease and in the summer season the thermoplastic resinous material which is adhered on the surface of the refractories begins to soften, and as a result a tacky adhesion occurs and the resin is adhered to the pallet at the time of transfer of the refractories and is also adhered to the operators at the time of construction of a furnace, and hence is not desirable. On the other hand, if the softening point is too high, the thermoplastic resinous material must be diluted with a suitable solvent (cutback) and also the amount of the solvent must be increased. Further, since it is necessary to elevate the temperature of the impregnation bath, a thermal decomposition reaction of the thermoplastic resinous material occurs and as a result a change of melt viscosity and an adhesion of the decomposed product to a wall of the apparatus, which are serious problems in the operation, take place.

The pre-heated refractories are transferred into an impregnating vessel, the and pre-heated impregnating liquid is charged into the vessel after the refractories are degassed under a reduced pressure therein. The impregnation can be carried out under a normal pressure or a pressure greater than normal pressure.

In order to carry out uniform impregnation into the inner part of the refractories, the viscosity of the impregnating liquid is preferably less than 200 centipoise and the temperature of the impregnating liquid is desirably maintained at a temperature of less than 250° C. When the temperature of the liquid is more than 250° C, a thermal decomposing reaction is generated and the viscosity of the liquid is increased so that it is not desirable. If necessary, a small amount of a petroleum fraction solvent having a high safety is used, such as a heavy oil or lubricating oil, in order to decrease the viscosity of the liquid.

The present invention is illustrated by the following examples.

EXAMPLE 1

A burned dolomite fire brick which had been preheated at 210° C and had an apparent porosity of 12.5% was transferred into an impregnating vessel and the vessel was maintained at the reduced pressure of 40 mmHg. Subsequently, the impregnating vessel was filled with the thermoplastic resinous material (softening point: 100° C; melt viscosity at 180° C; 600 centipoise; Conradson carbon: 40 parts by weight; benzene-insoluble fraction content; 3% by weight; quinoline-insoluble fraction content: substantially 0% by weight) after having been previously heated to 190° C. Said thermoplastic resinous material was obtained as a residue by the steam cracking of gas oil, followed by distilling off the lighter fraction at 250° C under 100 mmHg.

In this way the fire brick was impregnated with the thermoplastic resinous material.

The slag penetration resistance, slag erosion resistance and slaking resistance of the obtained fire brick were evaluated. The results of the evaluation are shown in Table 2.

EXAMPLE 2

Example 1 was repeated under the same conditions as described in Example 1 except that there was applied as the impregnant the thermoplastic resinous material (softening point: 73° C; melt viscosity at 180° C: 260 centipoise; Conradson carbon: 42% by weight; benzene-insoluble fraction content: 6.7% by weight; quinoline-insoluble fraction content: 0.2% by weight) which was obtained by reacting the residue obtained by the steam cracking of naphtha, at 130° C for 4 hours, followed by distilling off the fraction of initial boiling point of 250° C under 100 mmHg.

The evaluated results are shown in Table 2.

COMPARATIVE EXAMPLE 1

For the purpose of comparison, using as an impregnant a prior coal tar pitch (80 parts by weight of medium soft pitch were diluted with 20 parts by weight of creosote oil) the fire brick is impregnated with the impregnant under the same conditions as described in example 1 and the obtained fire brick was evaluated. The evaluated results are shown in Table 2.

As is clear from Table 2, it is proved that the fire brick obtained according to the process of the present invention has a superior slag penetration resistance and slag erosion resistance.

Table 2

| | | Example 1 | Example 2 | Comparative example 1 |
|---|---|---|---|---|
| Impregnating amount (% by wt.) | | 4.5 | 4.6 | 4.6 |
| Porosity of impregnated brick (%) | | 1.1 | 1.1 | 1.1 |
| Slag[1] erosion test | Eroded volume percentage (%) | 1.0 | 1.2 | 1.5 |
| | Maximum erosion depth (mm) | 0.7 | 0.8 | 1.1 |
| | Maximum penetration depth (mm) | 2.0 | 2.1 | 2.6 |
| Slaking[2] resistance | After 1 day | No change | No change | No change |
| | After 7 days | No change | No change | No change |
| | After 10 days | No change | No change | Slaking spot occurrence |
| | After 14 days | Slaking spot occurrence | Slaking spot occurrence | Slaking spot increase |
| | After 20 days | Slaking spot increase | Slaking spot increase | Slaking spot increase |
| | After 40 days | Slaking spot increase | Slaking spot increase | Slaking spot increase, partially crack occurrence |

[1]Using an oxygen-acetylene rotary slag erosion test machine, a slag erosion test was carried out by applying a converter slag to the test machine at 1,650° C for 4 hours.
The eroded volume percentage, maximum erosion depth and maximum penetration depth are respectively expressed as follows:

$$\text{Eroded volume percentage} = \frac{\text{Eroded volume}}{\text{Original volume}} \times 100 \ (\%)$$

Maximum erosion depth: Maximum depth of the recess which was formed by a slag erosion (mm)
Maximum penetration depth: Maximum depth of the slag penetration layer (mm)

[2]The slaking resistance was evaluated by an observation of appear-

Table 2-continued

| | Example 1 | Example 2 | Comparative example 1 |
|---|---|---|---| ance after the lapse of the number of prescribed days in the atmosphere maintained at 30° C and under the relative humidity of 80 %.

EXAMPLE 3

A burned magnesite fire brick which had been preheated at the temperature of 210° C and had an apparent porosity of 14.0% was transferred to an impregnating vessel and the vessel was maintained at a reduced pressure of 40 mmHg. Subsequently, the impregnating vessel was filled with the thermoplastic resinous material (softening point: 60° C; melt viscosity at 180° C: 200 centipoise; Conradson carbon: 35% by weight; benzene-insoluble fraction content: 2% by weight; quinoline-insoluble fraction content: substantially 0% by weight) after being previously heated to 190° C. Said thermoplastic resinous material was obtained by polymerizing the residue obtained by the steam cracking of gas oil in the presence of $AlCl_3$ as catalyst while blowing oxygen therein at 200° C, followed by distilling off the lighter fraction at 250° C under 100 mmHg.

In this way the fire brick was impregnated with the thermoplastic resinous material.

The slag erosion resistance of the obtained fire brick was evaluated. The results of the evaluation are shown in Table 3.

EXAMPLE 4

Example 3 was repeated under the same conditions as described in Example 3 except that there was applied as the impregnant the thermoplastic resinous material (softening point: 82° C; melt viscosity at 180° C: 290 centipoise; Conradson carbon: 37% by weight; benzene-insoluble fraction content: 4.3% by weight; quinoline-insoluble fraction content: 0.1% by weight) consisting of the thermoplastic resinous material obtained by distilling at 240° C under 100 mmHg the residue obtained by the steam cracking of gas oil and the thermoplastic resinous material obtained by reacting at 380° C for 1 hour the residue obtained by the steam cracking of naphtha in the ratio of 1:1 (by weight).

The evaluated results are shown in Table 3.

COMPARATIVE EXAMPLE 2

For the purpose of comparison, using as the impregnant coal tar pitch [diluted pitch (weight ratio): medium soft pitch/anthracene oil = 85/15], a fire brick was produced by impregnating under the same conditions as described in example 3 and the obtained fire brick was evaluated. The results of the evaluation are shown in Table 3.

As is clear from Table 3, it is proved that the fire brick obtained by using the thermoplastic resinous material according to the present invention compares well with the prior product and has a very superior performance.

Table 3

| | | Example 3 | Example 4 | Comparative example 2 |
|---|---|---|---|---|
| Impregnating amount (% by wt.) | | 4.7 | 4.5 | 4.9 |
| Porosity of impregnated brick (%) | | 0.8 | 0.7 | 0.8 |
| Slag erosion test | Eroded volume percentage (%) | 1.2 | 1.4 | 1.8 |
| | Maximum erosion depth (mm) | 0.9 | 1.1 | 1.4 |
| | Maximum penetration depth (mm) | 2.5 | 2.8 | 3.2 |

The thermoplastic resinous material according to the present invention is applicable to other refractory bricks such as alumina, silica and carbon bricks as well as dolomite and magnesia bricks even though no specific examples thereof are shown herein.

What we claim is:

1. A process for producing refractories of dolomite- or magnesia-type in which an impregnant is filled into open pores of said refractories, wherein said impregnant is a thermoplastic resinous material which is obtained by removing the light fraction having a boiling point of less than 200° C. under a reduced pressure of 100 mm Hg and having a benzene-insoluble fraction content of less than 10% by weight from at least one member selected from the group consisting of a heavy oil obtained by the steam cracking of petroleum and a polymerization product of said heavy oil.

2. A process as claimed in claim 1, wherein the petroleum is naphtha, kerosene, gas oil or a mixture thereof.

3. A process as claimed in claim 1, wherein the steam cracking of the petroleum is carried out at a temperature of about 700° to 1,000° C.

4. A process as claimed in claim 1, wherein the polymerization of the heavy oil is carried out in the absence of a catalyst.

5. A process as claimed in claim 1, wherein the polymerization of the heavy oil is carried out in the presence of a catalyst.

6. A process as claimed in claim 5, wherein the catalyst is a salt of iron, tin, aluminum or zinc.

7. A process as claimed in claim 6, wherein the catalyst is a chloride or nitrate salt.

8. A process as claimed in claim 5, wherein the catalyst is a radical polymerization catalyst.

9. A process as claimed in claim 8, wherein the catalyst is a benzoylperoxide or azobisisobutyronitrile catalyst.

10. A process as claimed in claim 5, wherein the catalyst is an oxidative polymerization catalyst.

11. A process as claimed in claim 10, wherein the catalyst is oxygen, an oxygen-containing gas or an oxygen-liberating compound.

12. A process as claimed in claim 1, wherein the thermoplastic resinous material is impregnated into the open pores of the refractories in the form of a solution of the thermoplastic resinous material in a solvent.

13. A process as claimed in claim 12, wherein the solvent is a petroleum solvent.

14. A process as claimed in claim 13, wherein said petroleum solvent is 70 pale oil, a lube oil fraction or heavy fuel oil.

* * * * *

UNITED STATES PATENT AND TRADEMARK OFFICE
CERTIFICATE OF CORRECTION

PATENT NO. : 4,009,308
DATED : February 22, 1977
INVENTOR(S) : Tadashi ZENBUTSU et al It is certified that error appears in the above-identified patent and that said Letters Patent are hereby corrected as shown below:

IN THE HEADING OF THE PATENT:

In the list of Inventors, all of the names are reversed and should read as follows:

-- Tadashi Zenbutsu

Hajime Asami

Seiichi Uemura

Takao Hirose --

Signed and Sealed this second Day of August 1977

[SEAL]

Attest:

RUTH C. MASON
*Attesting Officer*

C. MARSHALL DANN
*Commissioner of Patents and Trademarks*